Sept. 18, 1951  N. E. WASHBURN  2,568,673
RESISTANCE-TYPE PHONOGRAPH PICKUP
Filed Sept. 19, 1946  2 Sheets-Sheet 1
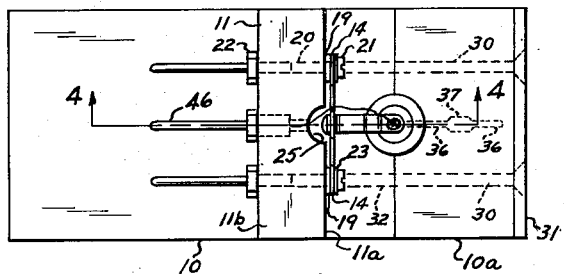
FIG.1
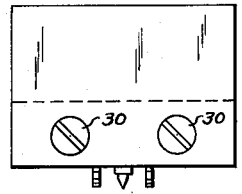
FIG.3
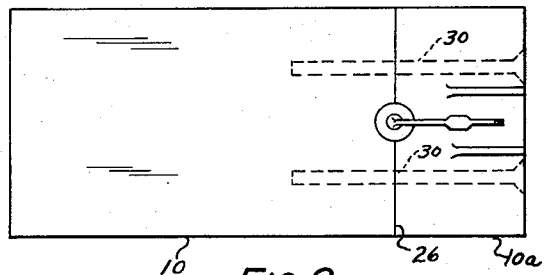
FIG.2
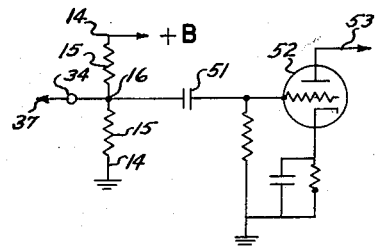
FIG.8
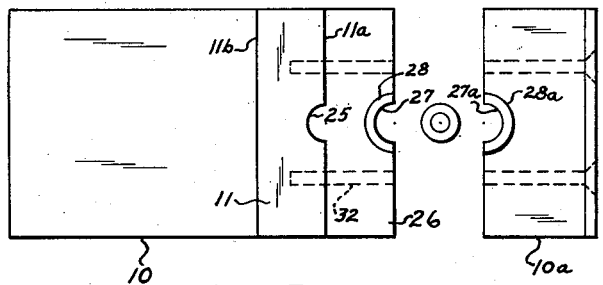
FIG.5
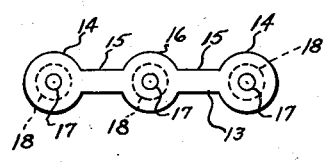
FIG.7
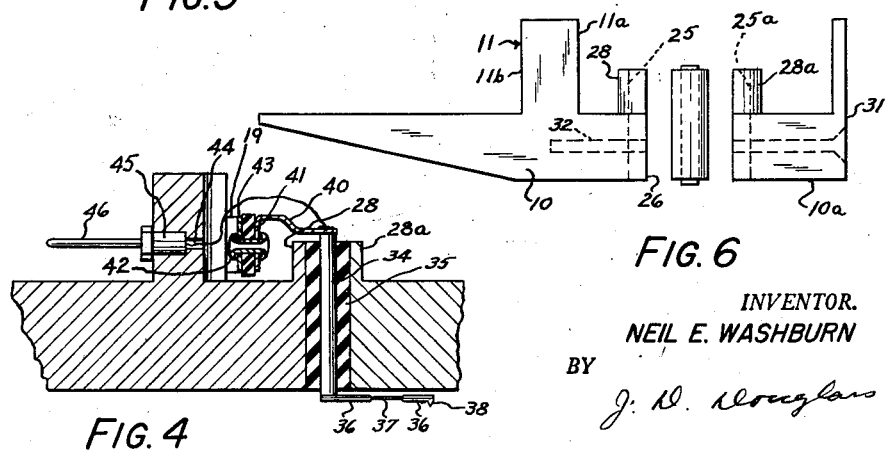
FIG.6
FIG.4
INVENTOR.
NEIL E. WASHBURN
BY
J. D. Douglas Sept. 18, 1951   N. E. WASHBURN   2,568,673
RESISTANCE-TYPE PHONOGRAPH PICKUP
Filed Sept. 19, 1946   2 Sheets-Sheet 2

INVENTOR.
NEIL E. WASHBURN
BY
J. D. Douglass

Patented Sept. 18, 1951

2,568,673

UNITED STATES PATENT OFFICE 2,568,673

RESISTANCE-TYPE PHONOGRAPH PICKUP

Neil E. Washburn, Chicago, Ill., assignor to Admiral Corporation, Chicago, Ill., a corporation of Delaware Application September 19, 1946, Serial No. 698,063

6 Claims. (Cl. 179—100.41)

This invention relates to apparatus for converting mechanical vibrations into corresponding electrical voltage variations, and more particularly to a device useful as a phonograph pickup, microphone, or the like, and the method of making the same.

Heretofore, many devices have been proposed for the conversion of mechanical vibrations into varying electrical currents. These devices included those using carbon granules, magnetic flux, piezoelectric effects, and capacitatively or inductively operated devices. These prior devices have often had certain inherent disadvantages which militated against their use. They often failed to faithfully reproduce the recorded vibrations by being capable of reproduction over a limited frequency range, or because they reproduced certain frequencies at a higher level than others and sometimes by reproducing sounds which were not intended to be reproduced. Not the least of the disadvantages of the prior art resided in the fact that many of the devices were extremely expensive to manufacture and required special equipment for their utilization, and deteriorated appreciably during use.

It is highly desirable in a device of this class to provide one which has certain desirable characteristics that increase its usefulness. For instance, in a phonograph pickup one of the prime considerations is the provision of one which has a wide range of frequency response with a minimum of distortion on the various frequencies reproduced and with a uniform output over the frequency range. Still another desirability in a device of this character resides in a device which is responsive only to the recorded vibrations and not to vibrations caused by the inherent texture of the recording medium.

The ideal pickup would be one where the pressure of the stylus or needle on the record is at a minimum and thus prevents wear of the record as well as affording long life for the needle; and wherein the excursions of the needle caused by the lateral conformation of the record groove produces a voltage that may be converted into sound in direct proportion to the excursions of the needle; and wherein inequalities caused by variations in the depth of the groove and the texture of the record are not reproduced. Furthermore, the design of the pickup should be such that any natural resonance of the pickup is beyond the audible range to thus simplify the construction of the subsequent amplifier. This is particularly true because if the resonant point is within the audible range and compensating circuits are used, this resonant point varies, even between pickups of the same construction, in such a manner that the compensation circuits are often ineffective.

The invention will be described in connection with its utilization in a phonograph pickup. It will be understood, however, that it may be utilized in other devices which will be apparent to those versed in the art.

I have discovered that certain materials have the desired characteristics for carrying out my invention. The more desirable materials are particularly so-called conducting rubbers. Rubber, ordinarily, as is well known, is a relatively good nonconductor. Certain conducting rubbers have been compounded, however, and have found use in the industry for purposes other than the present invention. More particularly are the so-called "anti-static" rubber tires which, because the rubber is conducting dissipates the accumulated static charge to ground. Another example is that of a so-called propeller de-icer which is applied to airplane propellers and through which a current may be passed causing the rubber to heat and free ice accumulation. There are various compounds of such rubber available today and they usually comprise a rubber base having a dispersion of finely divided carbon particles therein. I have found that such a rubber, if calendered into sheets approximately .025 inch thick, makes a highly desirable material.

I have also discovered, however, that such rubber subjected to ordinary curing processes is not entirely satisfactory, but that by proper treatment, rubber which ordinarily cannot be used for my purpose, can be given the desired characteristics and will operate in a highly satisfactory manner.

It will be appreciated that the prior rubber compounds referred to were compounded with a view to its conductivity such that static charges were easily passed or to provide a certain amount of resistance to current flow which caused heat. In either case, it was desirable that the resistance remain stable upon flexing of the rubber in order that the desired amount of current flow could be realized under varying conditions.

Broadly, the present invention contemplates utilizing a material, the resistance of which varies upon variations in tension placed on the material and utilizing the varying voltage across or current through such a material to reproduce sounds.

My invention, when utilized in a pickup, lends itself ideally to the solution of these problems, because the resonant point may be designed to be below the audible range, and the contact pressure of the needle with the record may be lessened to such an extent that wear of the record groove is reduced to a minimum. Further, the compliance of the stylus allows it to follow the lateral undulations of groove without that movement being transmitted to the arm itself or without the arm causing the stylus to apply greater pressure to one side of the groove than the other, and these lateral movements of the needle are faithfully converted to voltage variations which are directly proportional to the recorded vibrations.

This is largely due to the compliance of the conversion element, since the effort required to operate the element is very small and the movements of the elements are faithfully converted into voltage variations regardless of the frequency or amplitude of the recorded vibrations.

More specifically in its preferred form, I utilized a piece of the so-called conductive rubber to which a predetermined voltage is applied. The tension of the rubber is varied by attaching one end of a pivoted stylus to the rubber and allowing the other end of the stylus to be moved by the groove of a record. The vibrations recorded on the record which are transmitted by the stylus to the rubber vary the tension in the rubber thus enabling a varying voltage to be taken off of the rubber or a varying current through the rubber.

As I previously stated, the rubber available did not, in its normal state, have the desired characteristics to make it a good transducer. This was due to the fact that the resistance was too low to provide the desired voltage drop and, further, it conducted too much current which caused excessive heat and a resultant short life. Furthermore, there was not enough change in the resistance to afford the desired voltage or current change without the use of excessive amplification. Another disadvantage was that the amount of change in voltage varied with time and that the change in voltage was not linear with the stylus movement or stretching of the rubber, resulting in considerable distortion.

I have discovered that rubber, such as previously described, which was used for propeller de-icers, if properly aged, had a characteristic which included that of an increased static resistance as well as a decrease in resistance when being stretched. The disadvantage was that, since time was of the essence in providing the desired characteristic, it took too long to produce rubber by the normal aging process and, further, after incorporating into the transducer time still had an effect upon it, causing its static characteristics to change.

I have found that by heating the rubber artificially the time used for aging the rubber was materially decreased. What previously took months to accomplish could now be effected in a matter of hours. The heating could be effected by placing the material in an oven or by utilizing radio frequency currents. Oven heating had a tendency to overvulcanize the rubber and cause it to lose its life or resiliency. Transducers made employing rubber, naturally or artificially aged, were, however, very satisfactory and were found to give good service. As between oven and radio frequency heating, I found that radio frequency heating was the more desirable because the effect of this type of heating was to increase the resistance, and in radio frequency heating as the resistance increased, the heating of the rubber dropped and there was thus not the tendency to overheat the material.

Another method of treating the rubber was by working the rubber. The cured rubber, if properly kneaded, rolled, hammered, or stretched, increases in resistance to the desired value in a matter of minutes or even seconds, depending upon how violently it is worked. I have found that it is more expedient to hammer the rubber by actually applying blows to the rubber. Preferably, this may be and has been effected by placing the rubber in a suitable container with a plurality of balls and causing the balls to be agitated so that they fall upon the rubber. Preferably, the rubber is cut into small pieces of the desired shape so that these pieces become intermixed with the balls during agitation. A piece of rubber prior to the hammering treatment was found to have a resistance as low as 50,000 ohms, and by this treatment the resistance of the same piece may be raised in a relatively short time to several megohms.

Another and preferred form of treatment is to place the rubber in a cleaning solvent such as carbon tetrachloride or amyl acetate, which apparently removes the particles of carbon from the surface and provides the desired characteristics. Any solvent may be used. I have found that good results are obtained by a solvent which attacks the carbon.

After the rubber has been placed in the solvent, or cleaner, for a predetermined period, it is preferably removed and subjected to a mild heating by radio frequency currents which drive off the solvent and prevent further attacks of the solvent on the rubber.

Still other advantages of the invention, and the invention itself, will become more apparent from the following description of some embodiments thereof, which description is illustrated by the accompanying drawings and forms a part of this specification. It will be appreciated that the drawings and the description are, however, illustrative of but a few forms which the invention may take, and that although the invention is described in conjunction with its use as a phonograph pickup specifically, that it is not limited except as expressed in the appended claims.

In the drawings:

Fig. 1 is an enlarged top plan view of a phonograph pickup embodying my invention;

Fig. 2 is a bottom plan view thereof;

Fig. 3 is an end elevational view thereof;

Fig. 4 is a fragmentary sectional view taken on the line 4—4 of Fig. 1;

Fig. 5 is a plan view of certain parts in disassembled position;

Fig. 6 is an elevational view thereof;

Fig. 7 is a plan view of one of the rubber resistance elements removed from its association with the other parts;

Fig. 8 is a circuit diagram showing one manner in which my invention may be employed in an electrical circuit for use in connection with a phonograph amplifier;

Referring now to the drawings, throughout which like parts have been designated by like reference characters, the invention may be incorporated in a pickup and may take the form of a unit similar to the conventional crystal cartridge adapted to be connected into and carried by the usual pickup arm.

Figure 9:
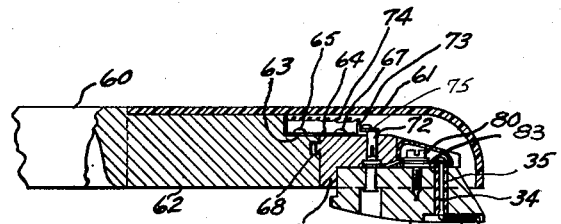
Fig. 9 is a fragmentary sectional view of a phonograph tone arm and illustrating likewise in section a modified form of a pickup utilizing my invention.
Figure 10:
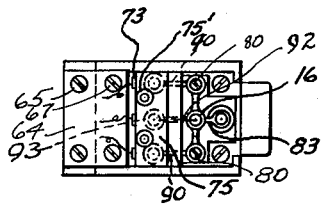
Fig. 10 is a top plan view of the pickup and its support removed from the arm.

The body of the unit is preferably made of some suitable insulating material such as polystyrene, or the like, and includes a base 10 of generally rectangular formation. On top of the base is provided a boss or lug 11 which rises above the base and is adapted to support the resistance element.

The active element 13, Fig. 7, which will hereinafter be referred to as a resistance element is preferably formed by die cutting the same from a sheet of the rubber previously described and of about .025 inch thickness. Preferably, it is formed to provide a pair of enlarged circular end portions 14 connected by necks 15 to an enlarged center portion 16. The length of the necks 15 may be varied. I have found that, in its preferred form, the necks should be relatively short, even shorter than that illustrated. The enlarged parts 14 and 16 provide a sufficient area of rubber to which a suitable connection can be made. These parts may be apertured at 17 and suitable eyelets, as indicated by the dotted lines at 18, are inserted in the apertures, and crimped into close contact with the surrounding rubber to thus provide a good metal contact with rubber and to facilitate subsequent electrical connections with the circuit as well as to support the element.

The resistance element 13 is supported on the side wall 11a of the boss 11, it being spaced from the wall by suitable washers 19 and held therein by studs 20 which extend through the eyelets, washers and the lug with the heads 21 engaging the front of the resistance element. The studs may be secured in place by nuts 22 screwed up against the opposite wall 11b of the boss 11 on the threaded stems of the studs. The free ends of the studs project beyond the wall 11b to provide for connection with a suitable socket not shown. Additional washers 23 may be provided between the heads 21 and the resistance element if desired. The studs 21 thus provide for connections to the ends of the resistance element, which is supported by its ends in spaced relation to the wall 11a on the boss 11. The wall 11a is provided with a semicylindrical groove 25 to provide a suitable clearance space for the center connection of the resistance element.

The base is formed at its front edge 26 with a semicylindrical groove 27 which extends from the bottom of the base upward and through an upstanding boss 28 that extends an appreciable distance above the base.

A second base member 10a is provided which is adapted to be secured to the main base 10 by screws 30, which extend from the end 31 of the base 10a through the base and are threaded into blind openings 32 in the base 10 to hold the two parts together. The screws are preferably countersunk as shown.

The base 10a is likewise provided with a groove 27a and a boss 28a, which, when the two parts 10 and 10a are secured together, form a cylindrical boss 28—28a having a cylindrical opening 27—27a, as best shown in Fig. 4.

The opening 27—27a is adapted to receive and hold therein a spindle 34 which is resiliently supported therein by a sleeve of live rubber 35 clamped in place when the base parts are secured together.

The lower end of the spindle has rigidly secured thereto in any manner as by soldering, welding, or the like, the stylus arm which may comprise a pair of cylindrical portions 36 connected together by a flattened but wider center portion 37 and provided at its end with a record groove engaging point 38 which may be a jewel or hard metal, such as osmium or the like. The flat center portion provides for vertical flexibility and yet gives lateral stiffness for the stylus, thus absorbing vertical vibrations and translating lateral vibrations.

The upper end of the spindle 34 has secured thereto a rearwardly extending stiff arm 40 that has a downwardly extending portion 41, the end of which is circular in form and of substantially the same size as the widened part 16 of the resistance element and to which it is rigidly secured by an eyelet 42 that extends through the arm, resistance element and a washer 43 at the back of the resistance element. A flexible lead is soldered to the top of the arm 41 at the end of the spindle 34 and connected through an opening 44 in the boss 11 to a stud 45, the enlarged end of which is secured in the lug and the free end 46 provides a male connector the same as the studs 20.

It will thus be seen that the construction is such that if lateral movement is applied to the point 37 it is translated through the stylus arm 36—37 to the spindle, which is rotatably supported in the live rubber sleeve 35. This movement is then transmitted by the arm 40 to the center portion 16 of the resistance element. The ends 14 of the resistance element being held by the studs 20, and the center portion 16 being gripped by the washer, eyelet and arm assembly 43, 42 and 41, movement of the stylus causes the neck portions 15 on either side of the center 16 to be extended or contracted in accordance with the direction of movement of the arm.

At this point, it may be well to point out that I have discovered a new, unsual and unexpected characteristic of the rubber treated by my invention. Heretofore, such pieces of conductive rubber, when stretched, increased in resistance, which is logically in accordance with the recognized laws of nearly all resistance material, namely, that the resistance increases with a decrease in cross sectional area. This resistance decrease was not, however, necessarily proportionate to the decrease in cross sectional area. The material, prior to treatment as proposed by my invention, operates in this manner. After treatment, however, I find that the resistance of the material, upon being stretched, instead of increasing with stretching, decreased. That is, a piece of my treated material in its normal state without tension thereon may have a resistance of 50 megohms. Immediately, however, upon tension being placed on the material, the resistance drops, and this drop in resistance increases with an increase in tension up until the point where the material actually breaks. This decrease in resistance, after initial tension is placed on the material, is substantially linear with the stretch of the material.

I believe that one explanation for the decrease in resistance during stretching of the material is due to the carbon particles being pushed closer together because of the decrease in cross sectional area. These particles, as is well known, are extremely fine, and especially are much finer than the carbon particles previously used in carbon microphones or the like. It will be appreciated, however, that subsequent analysis may explain the action on the basis of other theories, however, and this explanation should not be construed as of a limiting nature.

It should be noted that the stretching of the rubber occurs mostly in the necks 15. This is because the necks are the weakest places, and the end parts and middle portions are held securely by the eyelets. I have also found that it is desirable to place a very slight tension on the resistance element when it is secured to the studs 20, this tension being such, no matter how wide the swing of the stylus the tension on either of the necks is never completely relieved.

Figure 11:
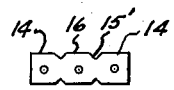
Fig. 11 is a plan view of a modified form of resistance element.

Fig. 11 illustrates a modified form of resistance element wherein the necked portions 15' are formed by providing V-shaped notches which extend from the edges inward toward each other to thereby concentrate the area of the portion which stretches. I have found this form to be very highly satisfactory in that a greater change in resistance is realized per unit length of stretch.

Figure 12:
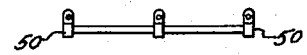
Fig. 12 is a view of another modification of resistance element.

I have also found that satisfactory results may be had by using a straight piece of rubber such as is illustrated in Fig. 12. In this instance, the rubber is provided with sleeves 50 of metal which is wrapped around the ends and the center and crimped to the rubber to hold it and provide the desired electrical connections. This, although satisfactory, and practical, does not lend itself as readily to high production as the forms previously described.

Fig. 8 illustrates schematically the resistance element incorporated in an electrical circuit adapted for connection to a suitable amplifier. It will be noted that a voltage source indicated at B is applied to one of the terminals 14, the other being grounded. The stylus with the point 37 and its spindle 34 is connected between the two resistance necks 15. The output from the device is then through a coupling condenser 51 to the grid of the vacuum tube amplifier 52. The amplifier may take any form desired and the output 53 connected to any succeeding amplifier as desired. I have found that very satisfactory results can be secured with a voltage supply of 25 volts. It will be appreciated that the actual output of the pickup will increase with an increase in voltage and will be limited only with the ability of the rubber to stand a higher voltage without excessive heating. For instance the number of amplification stages may be decreased by applying a voltage as high as 100 volts.

Figure 13:
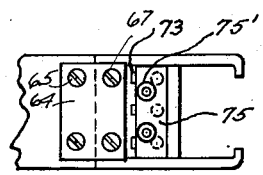
Fig. 13 is a plan view of the pickup unit holder with the pickup removed and showing its manner of association with its supports.
Figure 15:
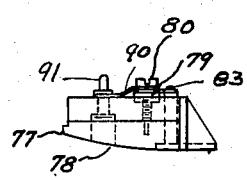
Fig. 15 is an elevational view of the pickup unit removed from the holder.
Figure 14:
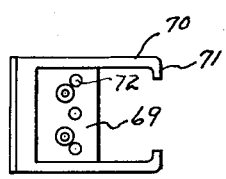
Fig. 14 is a bottom plan view of the holder.

In Figs. 9 to 16, I have illustrated a modified form of pickup unit and the manner of its mounting in a pickup arm. The pickup arm, indicated at 60, is provided with an end cover portion 61 which may be removably secured on the end of the arm in any desired manner. The interior of the arm is provided with a solid wall portion 62 extending transversely across the arm, the upper part of which provides a shelf 63 to which is secured a leaf spring 64 by screws such as 65. The spring 64 extends beyond the end of the solid portion and supports a connector block 66, the spring 64 being secured thereby by screws 67. The end of the part 62 is provided with a transverse groove into which a tongue 68 in the block extends. The fit of the tongue in the groove is close but not tight. By this connection the block 66 may be sprung upward when excess pressure is applied as hereinafter described preventing damage to the needle and the record upon careless handling. The block 66, as best shown in Fig. 14, is provided with a socket for rigidly holding the pickup cartridge, and which comprises a rectangular recess 69 formed in the bottom of the block, the sides of the block extending beyond the recess to provide a pair of spaced parallel arms 70 having inturned ends 71. Female connectors 72 are disposed in the block having solder lugs 73 extending from the upper end to which the connecting wires 74 may be secured. The connectors being held in place by a strip 75 secured to the top of the block by rivets 75' (Fig. 13).

Figure 16:
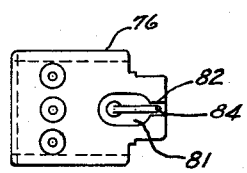
Fig. 16 is a bottom plan view thereof.

The unit in this case is adapted to be rigidly carried in the socket and be quickly removable therefrom for replacement if desired. As best shown in Fig. 16, it includes a rectangular body portion 76 shaped to fit into the socket 69 and to be embraced by the arms 70—71. The bottom of the unit at the rear thereof is provided with a transverse rib 77 to provide a finger grip for removing the same. The bottom surface is curved at 78 to provide a surface adapted to ride on the record should excessive pressure be accidentally applied to the arms as by dropping it, which allows the socket and the unit to rock due to the resilience of the spring 64.

The upper face of the unit is provided with a pair of spaced bosses 79 to which the resistance element is secured by headed screws 80 which extend through the eyelets and are threaded into the body of the unit. The resistance unit is thus supported in a horizontal plane as distinguished from the other embodiment wherein the resistance element was disposed in a vertical plane. The spindle 34 is supported in a live rubber bushing 35 disposed in a vertical bore in the unit, the spindle and its bushing being simultaneously forced into the bore.

The ends of the resistance element are connected by connections 90 to the male prong 91 secured in the body while the center of the element is connected by a flexible connection 92 to the center male prong 93.

The lower face of the unit is provided with a recess 81 into which the end of the spindle extends, the end of the needle being secured thereto and being protected by the walls of the recess. A groove 82 is formed which extends from the recess through the lower face to the forward end of the unit and the walls of which guard the needle 84. The end of the needle extends downward and is provided with a jewelled or hard metal point such as osmium as previously described. The body of the needle, in this instance, as can best be seen in Figs. 9 and 16, is of very thin resistant metal being an appreciable width. Being thin, it bends upward with ease, but being wide, it resists bending, thus the lateral undulations of the groove have the greatest effect and noise due to texture of the record is greatly reduced.

The upper end of the spindle is connected to the center 16 of the resistance unit by the arm 83 which, in this instance extends straight from the spindle to the resistance unit.

It will be noted that in this embodiment, the arm 83 is relatively short as compared with the needle arm 84. Thus the ratio of movement of the needle arm 84 to the arm 83 is greater but, because of this ratio, greater effort may be applied to the resistance unit.

In operation electrically the unit is the same as in the preceding embodiment. Greater protection against injury is afforded, however, because any undue pressure or sudden blow may cause the unit and its socket to rock about the spring pivotal connection until the portion 78 rides on the record or on the turntable if there is no record on it, preventing scratching of the record or permanent injury to the stylus.

I have found that, with a pickup constructed according to my invention, the wear on the records is decreased materially. The fidelity of reproduction is greatly increased without the introduction of undesired sounds and with a minimum distortion over a large range of frequencies and amplitude. The so-called "play back" which is the sound ordinarily reproduced in the unit mechanically is reduced to a minimum and to a point where it does not interfere with even the softest musical passages.

I have also found that the material is completely free from any inherent audible noise such as is ordinarily present in previously known carbon microphone.

It will be apparent that the materials used are not subjected to the deleterious effects of humidity and heat. Internal noise is substantially non-existent. Another important advantage resides in the fact that the device is extremely rugged and will withstand a great deal of abuse without effecting its operation, since the various elements which make up the construction are more nearly of an indestructible nature than previous devices. Furthermore, the construction is extremely economical inasmuch as the materials used are not critical and the amount of resistance material necessary to the construction is exceedingly small.

The unit lends itself to economical and speedy production by relatively unskilled labor since there are no critical adjustments to be made.

It will be appreciated that, although I have illustrated my resistance element as being incorporated in a potentiometer type of circuit, it may be utilized in other manners and is workable in various other types of circuits. Furthermore, one of the arms 15 of the resistance could be eliminated if desired and only one arm used, also a fixed resistance could be substituted for the one arm and very good results obtained.

Where I have described the element as being under tension in its preferred form, I have obtained very good results by placing the material under compression and varying the amount of compression. This is particularly useful in recording or reproducing vibrations in apparatus other than phonograph pickups. I have found that an element, such as shown in Fig. 12, is also useful in a phonograph pickup wherein the element does not necessarily have to be under tension but can be in its normal state without tension or actually under some degree of compression.

Having thus described my invention, I am aware that numerous and extensive departures may be made therefrom without departing from the spirit and scope of my invention.

I claim:

1. A phonograph pickup, or the like, including a support, a resistance element carried by said support and comprising a rubber body having conductive particles embedded therein throughout the body in juxtaposed relation to each other, said rubber body being formed to provide a reduced cross sectional area upon being stretched and the rubber carrying the particles into closer relation to each other to decrease the resistance, a voltage source connected to said resistance element, means to remove a voltage from said resistance element connected across at least a portion thereof and means to increase and decrease tension in the resistance element to vary the voltage thereacross, said support means for pretensioning the resistance element comprising support members spaced apart a greater distance than the length of the element in an untensioned state and arranged to hold the element in a pretensioned state when positioned thereon.

2. An electrical transducer including a resistance element comprising a rubber body having conductive particles embedded therein in juxtaposed relation to each other and means whereby said particles are moved into closer contact with each other upon stretching of the rubber to decrease the resistance, means for supporting said element at its ends in a pretensioned state comprising supporting elements disposed in spaced apart relation, the spacing of which is greater than the length of the rubber body, means to apply a voltage across said element, means to remove a varying voltage from said element connected to an intermediate point of said element and across a portion thereof, and means connected to an intermediate point of said element to vary the tension in the parts on either side of said point.

3. A phonograph pickup including a support, a resistance element supported on the support and comprising a rubber body having conductive particles embedded therein and means whereby said particles are forced into more intimate engagement with each other upon reducing the cross sectional area of the body, to decrease the resistance, supports disposed in spaced apart relation to each other, the spacing being greater than the resistance element and means whereby the resistance element is held under tension at all times, voltage supply means connected to said element, a pivotally mounted spindle having an arm extending therefrom the end of which is connected to the mid-section of said resistance element, and a stylus carried by the spindle extending in the opposite direction to said arm and adapted for engagement with a record groove and means connected to said mid-section for taking a varying voltage from said element upon movement thereof by the stylus.

4. A pickup including an arm, a spring support carried by the arm and a socket carried by said support, pickup means for removable engagement with said socket, said pickup having a stylus for engagement with the record grooves and a wall surrounding said stylus and having a curved portion adapted to ride on a record upon predetermined pressure being applied to the stylus, said socket and pickup arm being tiltable on said spring support upon pressure applied thereto, said stylus being flexible in a vertical direction and rigid in a horizontal direction to reduce the transmission of vertical movements thereof and increase the transmission of lateral movements thereof.

5. A phonograph pickup in combination, a support a vibration transmitting member having a stylus, a lever arm extending from said member and means to support the member on said support intermediate the end of the stylus and the lever arm, an element for translating vibrations into voltage variations comprising a strip of a soft resilient material having a negative tension coefficient of resistance, said translating element being formed to provide a dampening effect for harmonic distortion in the vibration transmitting members, support means for said translating element formed to support said translating element at its ends in a pretensioned state, said translating element being tensioned to eliminate self resonant audible frequency characteristics in said translating element and said transmitting members, said transmitting member being connected to the translating element at an intermediate point thereof, means to supply a potential to the translating element, and means to remove voltage variations from the translating element.

6. A phonograph pickup comprising a stylus pivot means for supporting said stylus and an arm carried by said pivot means, a pair of spaced apart supports and a piece of material comprising a resilient displaceable homogeneous body, particles of finely divided conducting material carried by said body and arranged to be forced into more intimate contact with each other to lower the resistance of the body when the cross sectional area is decreased by stretching, said piece of material being carried by said spaced supports, said supports being spaced apart a greater distance than the length of the body and means to support the body in a pretensioned state, said arm being connected to said rubber intermediate said supports, and means for applying a potential across said rubber and means for removing voltages from said rubber at the point of connection of said arm.

NEIL E. WASHBURN.

REFERENCES CITED

The following references are of record in the file of this patent:

UNITED STATES PATENTS

| Number | Name | Date |
| --- | --- | --- |
| 587,654 | Enholm | Aug. 3, 1897 |
| 782,232 | Gardner | Feb. 14, 1905 |
| 2,280,763 | Hasbrouck | Apr. 21, 1942 |
| 2,318,657 | Alexander | May 11, 1943 |
| 2,348,660 | Stephan | May 9, 1944 |
| 2,368,003 | Courcy | Jan. 23, 1945 |
| 2,373,676 | Germeshausen | Apr. 17, 1945 |
| 2,379,282 | Dally | June 26, 1945 |
| 2,380,514 | Germeshausen | July 31, 1945 |
| 2,415,403 | Bachman | Feb. 11, 1947 |
| 2,429,137 | Root | Oct. 14, 1947 |
| 2,444,218 | Carnahan | June 29, 1948 |
| 2,471,601 | Albright | May 31, 1949 |
| 2,491,794 | Bachman | Dec. 20, 1949 |